US009568611B2

United States Patent
Cosatto et al.

(10) Patent No.: US 9,568,611 B2
(45) Date of Patent: Feb. 14, 2017

(54) DETECTING OBJECTS OBSTRUCTING A DRIVER'S VIEW OF A ROAD

(71) Applicant: NEC Laboratories America, Inc., Princeton, NJ (US)

(72) Inventors: Eric Cosatto, Red Bank, NJ (US); Hans Peter Graf, Lincroft, NJ (US)

(73) Assignee: NEC CORPORATION (JP)

( * ) Notice: Subject to any disclaimer, the term of this patent is extended or adjusted under 35 U.S.C. 154(b) by 0 days.

(21) Appl. No.: 14/830,873

(22) Filed: Aug. 20, 2015

(65) Prior Publication Data

US 2016/0054452 A1 Feb. 25, 2016

Related U.S. Application Data

(60) Provisional application No. 62/039,523, filed on Aug. 20, 2014.

(51) Int. Cl.
*G01S 19/51* (2010.01)
*G01C 21/36* (2006.01)
(Continued)

(52) U.S. Cl.
CPC .............. *G01S 19/51* (2013.01); *B60K 35/00* (2013.01); *G01C 21/3629* (2013.01);
(Continued)

(58) Field of Classification Search
CPC ........ G01C 21/26; B60Q 1/00; B60R 21/0132
See application file for complete search history.

(56) References Cited

U.S. PATENT DOCUMENTS 7,847,678 B2 * 12/2010 Kawamata ................ B60R 1/00
340/425.5
8,212,812 B2 * 7/2012 Tsin ..................... G06F 17/5095
345/420
(Continued)

OTHER PUBLICATIONS

Sermanet et al., "Overfeat: Integrated Recognition, Localization and Detection Using Convolutional Networks", arXiv:1312.62294v4 [cs.CV] Feb. 24, 2014.

(Continued)

*Primary Examiner* — Thomas Tarcza
*Assistant Examiner* — Alex C Dunn
(74) *Attorney, Agent, or Firm* — Joseph Kolodka (57) ABSTRACT

A system and method for a motorized land vehicle that detects objects obstructing a driver's view of an active road, includes an inertial measurement unit-enabled global position system (GPS/IMU) subsystem for obtaining global position system (GPS) position and heading data of a land vehicle operated by the driver as the vehicle travels along a road, a street map subsystem for obtaining street map data of the GPS position of the vehicle using the GPS position and heading data as the vehicle travels along the road, and a three-dimensional (3D) object detector subsystem for detecting objects ahead of the vehicle and determining a 3D position and 3D size data of each of the detected objects ahead of the vehicle. The street map subsystem merges the street map data, the GPS position and heading data of the vehicle and the 3D position data and 3D size data of the detected objects, to create real-time two-dimensional (2D) top-view map representation of a traffic scene ahead of the vehicle. The street map subsystems finds active roads ahead of the vehicle in the traffic scene, and finds each active road segment of the active roads ahead of the vehicle that is obstructed by one of the detected objects. A driver alert subsystem notifies a driver of the vehicle of each of the active road segments that is obstructed by one of the detected objects.

13 Claims, 6 Drawing Sheets

(51) Int. Cl.
*B60K 35/00* (2006.01)
*G01S 19/48* (2010.01)
*G01S 19/14* (2010.01)
*G01S 19/49* (2010.01)
*G01S 11/12* (2006.01)
*G01S 17/89* (2006.01)
*G01S 17/93* (2006.01)
*G01S 13/93* (2006.01)
*G01S 13/86* (2006.01)

(52) U.S. Cl.
CPC .......... *G01C 21/3697* (2013.01); *G01S 11/12* (2013.01); *G01S 13/931* (2013.01); *G01S 17/89* (2013.01); *G01S 17/936* (2013.01); *G01S 19/14* (2013.01); *G01S 19/48* (2013.01); *G01S 19/49* (2013.01); *B60K 2350/1084* (2013.01); *B60K 2350/962* (2013.01); *B60K 2350/965* (2013.01); *G01S 13/867* (2013.01)

(56) References Cited

U.S. PATENT DOCUMENTS

| | | | | |
|---|---|---|---|---|
| 8,301,344 B2* | 10/2012 | Simon | ...................... | B60R 1/00 701/45 |
| 9,052,207 B2* | 6/2015 | Miksa | .................... | G01C 21/30 |
| 2006/0253245 A1* | 11/2006 | Cera | .................. | G06F 3/04815 701/117 |
| 2006/0253246 A1* | 11/2006 | Cera | ................. | G08G 1/096861 701/117 |
| 2008/0069400 A1* | 3/2008 | Zhu | ....................... | G06K 9/3241 382/103 |
| 2008/0243378 A1* | 10/2008 | Zavoli | .................... | G01C 21/28 701/533 |
| 2009/0202107 A1* | 8/2009 | Wilson | ............... | G06K 9/00818 382/103 |
| 2009/0228204 A1* | 9/2009 | Zavoli | .................... | G01C 21/30 701/532 |
| 2011/0293141 A1* | 12/2011 | Robert | ............... | G06K 9/00785 382/103 |
| 2012/0271540 A1* | 10/2012 | Miksa | .................... | G01C 21/30 701/409 |
| 2013/0035827 A1* | 2/2013 | Breed | ................. | B60R 21/0132 701/45 |
| 2013/0129143 A1* | 5/2013 | Chen | .................... | G06K 9/6218 382/103 |
| 2014/0185925 A1* | 7/2014 | Datta | .................... | G06K 9/6256 382/159 |

OTHER PUBLICATIONS

Ji et al., "Radar-Vision Fusion for Object Classification", 2008 11th International Conference, IEEE 2008.

Zhang et al. "Vehicle Detection Based on LIDAR and Camera Fusion", 2014 IEEE 17th International Conference on Intelligent Transportation Systems (ITSC), Oct. 8-11, 2014, Qingdao, China.

\* cited by examiner

DETECTING OBJECTS OBSTRUCTING A DRIVER'S VIEW OF A ROAD

RELATED APPLICATIONS

This application claims claim the benefit of U.S. Provisional Application No. 62/039,523, filed Aug. 20, 2014, the entire disclosure of which is incorporated therein.

FIELD

The present disclosure relates to automated or semi-automated control of a motorized land vehicle.

BACKGROUND

Often, a driver's view of intersecting roads ahead of the driver's motorized land vehicle may be partially or completely obstructed by various objects, such as other motorized land vehicles, particularly large motorized land vehicles, such as trucks and buses, by vegetation, such as trees and shrubs, walls, fences and/or buildings. Hence the driver may have no clue that another motorized land vehicle may suddenly emerge from the intersecting road, potentially creating a collision.

In addition, there are many driving distractions including for example, cell phones and passengers, which makes the driver more likely to not notice partially obstructed roads.

Accordingly, a system method is needed that detects objects obstructing a driver's view of roads thereby providing an additional level of safety for driving motorized land vehicles and autonomously driven motorized land vehicles.

SUMMARY

Disclosed herein is a system and a method for a motorized land vehicle that detects objects obstructing a driver's view of an active road. The system and method comprise an inertial measurement unit-enabled global position system (GPS/IMU) subsystem for obtaining global position system (GPS) position and heading data of a land vehicle operated by the driver as the vehicle travels along a road, a street map subsystem for obtaining street map data of the GPS position of the vehicle using the GPS position and heading data as the vehicle travels along the road, and a three-dimensional (3D) object detector subsystem for detecting objects ahead of the vehicle and determining a 3D position data of each of the detected objects ahead of the vehicle. The street map subsystem merges the street map data, the GPS position and heading data of the vehicle and the 3D position data of the detected objects, to create real-time two-dimensional (2D) top-view map representation of a traffic scene ahead of the vehicle. The street map subsystem also finds active roads ahead of the vehicle in the traffic scene, and finds each active road segment of the active roads ahead of the vehicle that is obstructed by one of the detected objects. A driver alert subsystem notifies the driver of the vehicle of each of the active road segments that is obstructed by one of the detected objects.

DETAILED DESCRIPTION

Figure 1:
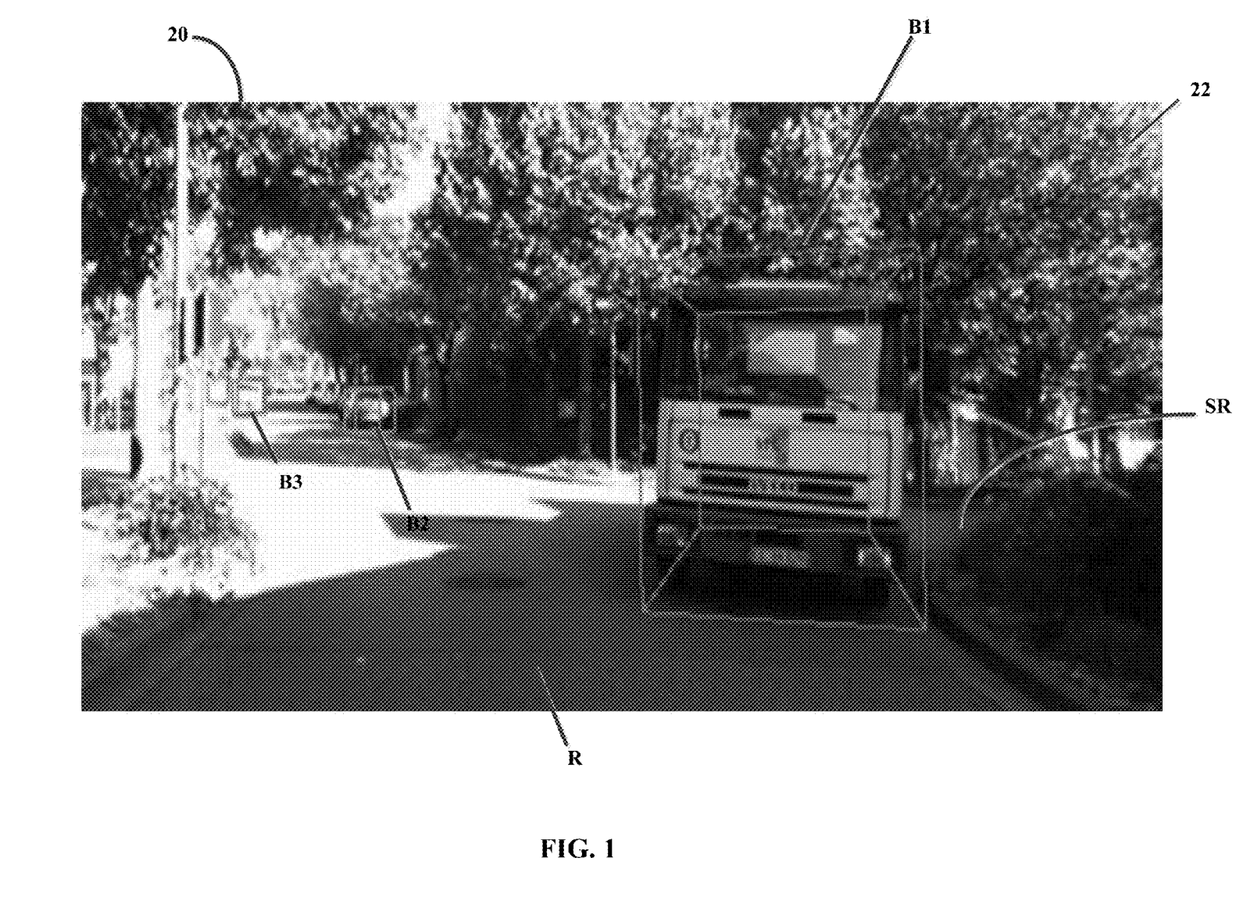
FIG. 1 illustrates an intersection as seen from a driver's motorized land vehicle where an object (truck) is parked on the side of a road obstructing the view to an intersecting side road.

A hidden object detection system and a corresponding hidden object detection method are described herein. As illustrated in FIG. 1, the system and method detects objects obstructing a driver's view of an active road, such as a truck identified by 3D bounding box B1 parked on the side of road R obstructing the driver's view of an intersecting side road SR. Other objects are identified further on down the road by 3D bounding boxes B2 and B3. The hidden object detection system and method of the present disclosure is an improvement over existing collision avoidance methods and systems, which do not address streets hidden by various objects.

Traffic situations, such as the one illustrated in FIG. 1, contain inherent danger, as a vehicle may be hidden behind the obstructing object and may suddenly emerge and collide with the driver's motorized land vehicle. The system and method improve the safety of driving or maneuvering the vehicle, by signaling to the driver of the vehicle the presence of hidden and/or obstructed roads, road segments, and intersecting roads ahead of the vehicle. The term "road," as used herein, includes without limitation all types of streets, roads, and highways. The motorized land vehicle can include without limitation, an automobile (car), a sport utility vehicle (SUV), a van, a truck, a bus, a motor cycle, and a motor scooter. Although the system and method described herein is configured and adapted for manually driven or operated motorized land vehicles, one of ordinary skill in the art will recognize that the system and method can be easily configured and adapted for autonomously driven or operated motorized land vehicles.

Figure 2A:
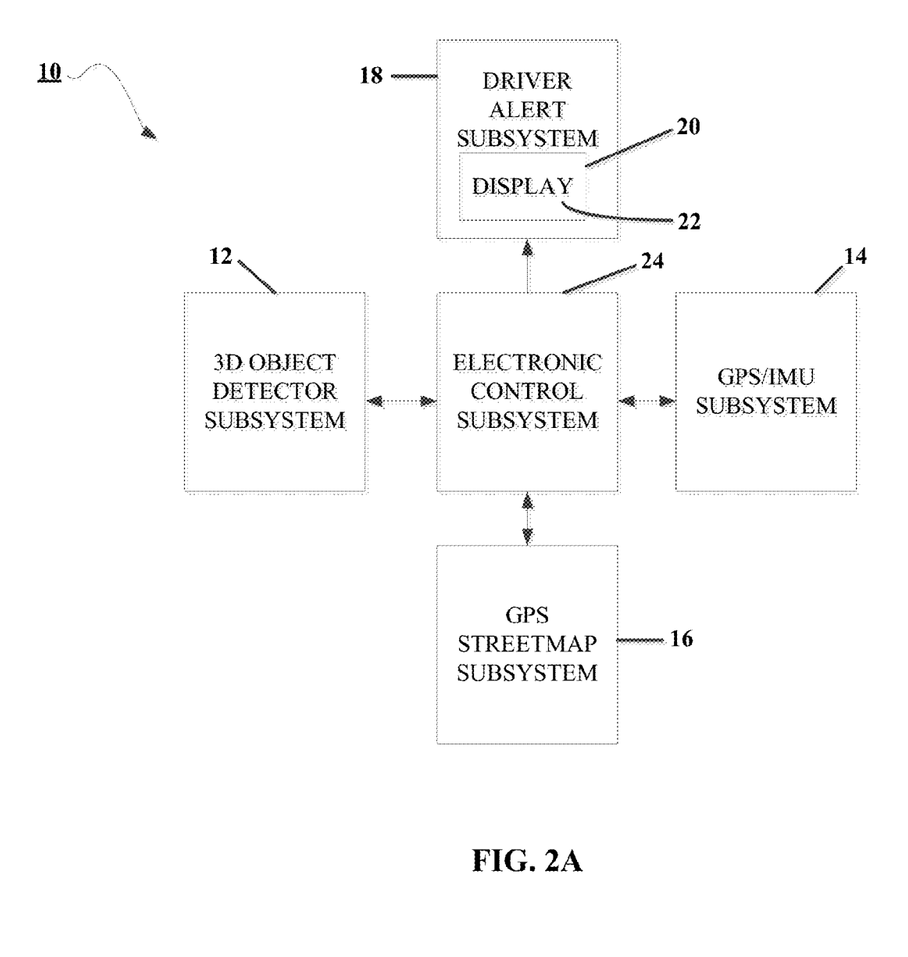
FIG. 2A is a block diagram of an embodiment of a hidden object detection system according to the present disclosure.
Figure 2B:
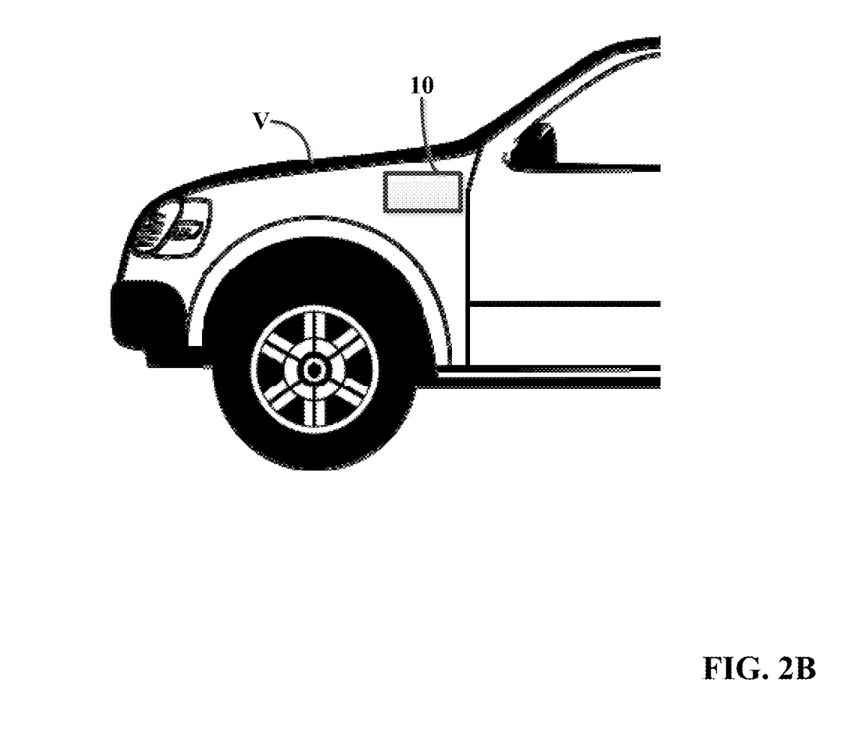
FIG. 2B illustrates an arrangement of a vehicle equipped with the hidden object detection system of the present disclosure.

FIG. 2A is block diagram of an embodiment of the hidden object detection system 10 according to the present disclosure. The system comprises a three-dimensional (3D) object detector subsystem 12, an inertial measurement unit-enabled global position system (GPS/IMU) subsystem 14, a GPS street map subsystem 16, a driver alert subsystem 18, and an electronic control subsystem 24 to which the 3D object detector subsystem 12, GPS/IMU subsystem 14, GPS street map subsystem 16, and driver alert subsystem 18, are electronically or otherwise communicatively coupled. The entire system 10, in some embodiments, can be incorporated into the driver's vehicle V as illustrated in FIG. 2B. In other embodiments, various subsystems of the system 10 can be added to subsystems already existing in the vehicle.

The 3D object detector subsystem 12 obtains for the system, data representing the 3D position and the 3D size of objects relative to and in front or ahead of the vehicle as it travels along a road. The objects can include, without limitation, other vehicles, such as cars, SUVs, vans, trucks, and buses. The object can also include, without limitation, buildings, walls, fences, signs, people, animal, and vegetation, such as trees and shrubs.

In some embodiments, the 3D object detector subsystem 12 may comprise a single, conventional automotive video camera unit, which generates a video stream of the traffic scene ahead of the vehicle. The video camera unit can be mounted at the front, the sides, the roof, or any other suitable location of the driver's vehicle which allows the video camera unit to capture the traffic scene ahead of the vehicle. The video stream can be analyzed using any conventional 3D-structure-from-motion algorithm executed or performed with the electronic control subsystem 24, to provide the 3D position of the objects captured in the video stream. Note that due to the nature of the algorithm, the 3D voxels of objects are only partially elucidated. The type and scale of each detected candidate object may then be determined by processing the video stream with a conventional machine learning object recognition algorithm (see, for example, "Overfeat: Integrated recognition, localization and detection using convolutional networks," by Sermanet, Pierre, David Eigen, Xiang Zhang, Michael Mathieu, Rob Fergus, and Yann LeCun. arXiv preprint arXiv:1312.6229 (2013)) executed or performed with the electronic control subsystem 24. The object recognition algorithm can include, without limitation, a convolutional neural network or a deep neural network, which determines the type and scale of learned objects. Once the type and scale of an object is detected, a standard size can be used as an approximation and a rough 3D size can then be calculated and combined with partial 3D voxels of the object to obtain a final more accurate measure of the 3D size of the object.

In other embodiments, the 3D object detector subsystem 12 may comprise two conventional automotive video camera units mounted at the front, the sides, the roof, or any other suitable location of the driver's vehicle which allows the video camera unit to capture the traffic scene ahead of the vehicle. The two video cameras generate a dual video stream of the traffic scene ahead of the vehicle, which can be first analyzed using any conventional stereo-reconstruction algorithm executed or performed with the electronic control subsystem 24, to provide depth information and then analyzed using any conventional 3D-structure-from-motion algorithm, which can also be executed with the electronic control subsystem 24, to provide the 3D position of the objects captured in the video stream. Note that due to the nature of the algorithm, the 3D voxels of objects are only partially elucidated. As in the previous embodiment, the 3D size of each of the objects may be determined with the electronic control subsystem 24, which processes the video stream with a conventional object recognition machine learning algorithm, which can include, without limitation, a convolutional neural network or a deep neural network, which determines the type and scale of each object. Once the type and scale of an object is detected, a standard size can be used as an approximation and a rough 3D size can then be calculated and combined with partial 3D voxels of the object to obtain a final more accurate measure of the 3D size of the object.

In still other embodiments, the 3D object detector subsystem 12 may comprise a conventional automotive radar unit and a conventional automotive video camera unit. The radar unit and/or components thereof can be mounted at the front, the sides, the roof, or any other suitable location of the driver's vehicle which allows the radar unit to capture the traffic scene ahead of the vehicle. Similarly, the video camera unit can be mounted at the front, the sides, the roof, or any other suitable location of the driver's vehicle which allows the video camera unit to capture the traffic scene ahead of the vehicle. The radar unit senses the presence of objects using well known echo location methods executed or performed with the electronic control subsystem 24. The radar unit generates, several times a second, a list of detected objects and their 2D positions and speed relative to the driver's vehicle. The third dimension is the vertical position of the object. Because the 3D size of the objects cannot be obtained directly, it has to be inferred from a video stream of the traffic scene ahead captured with the video camera unit, which video stream can be processed by the electronic control subsystem 24 using a conventional object recognition machine learning algorithm, which can include, without limitation, a convolutional neural network or a deep neural network, which determines the type and scale of each object. Once the type and scale of an object is detected, a standard size can be used as an approximation and the 3D size can then be calculated. Object detectors that fuse radar and video sensory inputs to recognize types of objects are well known (see, for example, "Radar-Vision Fusion For Object Classification," by Zhengping Ji et al., Information Fusion, 2008 11th International Conference, pages 1-7, IEEE, 2008).

In still further embodiments, the 3D object detector subsystem 12 may comprise a conventional automotive lidar unit and, optionally, a conventional automotive video camera unit. The lidar unit senses objects directly in 3D, in 360 degrees using a rotating laser. The lidar unit may be mounted on the roof of the driver's vehicle and the video camera may be mounted at the front, the sides, the roof, or any other suitable location of the driver's vehicle which allows the video camera unit to capture the traffic scene ahead of the vehicle. The lidar unit generates 3D voxel clouds several times per second. A conventional clustering method performed with the electronic control subsystem 24, may be used to cluster groups of the 3D pixels into objects. A video image obtained with the video unit, can then be optionally processed with the electronic control subsystem 24 and used to verify the identity of detected objects by processing the video stream with a conventional machine learning object recognition algorithm, which can include, without limitation, a convolutional neural network or a deep neural network, which determines the type of each object. Object detectors that fuse lidar and video sensory inputs to recognize and locate 3D objects are well known (see, for example, "Vehicle Detection Based On LiDAR And Camera Fusion," by Feihu Zhang et al., Intelligent Transportation Systems (ITSC), 2014 IEEE 17th International Conference, pages 1620-1625, IEEE, 2014).

Figure 3:
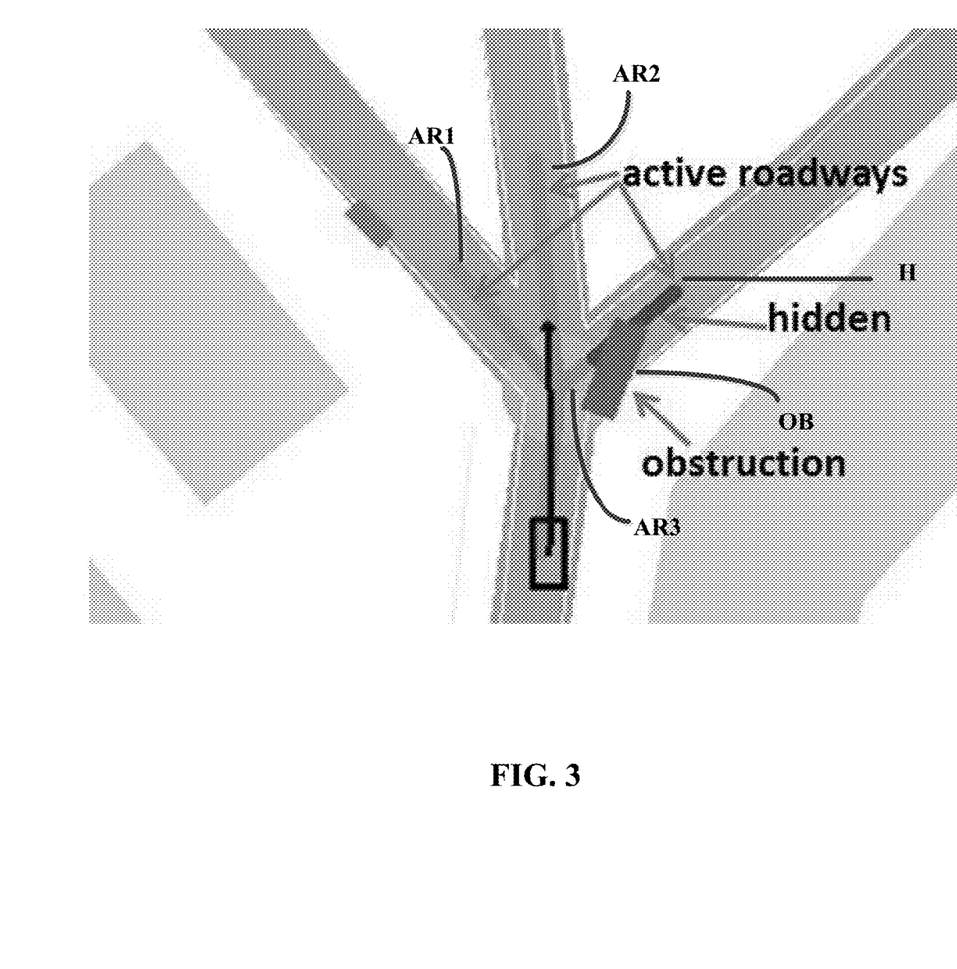
FIG. 3 illustrates a real-time vector analysis of the traffic scene ahead of the driver's vehicle using a two-dimensional top-view map representation of the traffic scene. As illustrated therein, the top-view map representation combines objects detected by a three-dimensional object detector subsystem of the hidden object detection system of the present disclosure, and the road geometry obtained from a GPS position of the driver's motorized land vehicle and digital map data.

The GPS/IMU subsystem 14 provides an accurate global position system (GPS) position and heading data of the driver's vehicle, as it travels along the road, which is used by the street map subsystem 16 to place it on a top-view two-dimensional (2D) street map, as illustrated in FIG. 3. In some embodiments, the GPS/IMU subsystem 14 used in the system 10 may comprise any conventional GPS chip. In other embodiments, the GPS/IMU subsystem may be part of the GPS street map subsystem 16.

The GPS street map subsystem 16, in some embodiments (e.g., if the GPS/IMU comprises a GPS chip), is constructed and adapted to request street map data from a map provider, such as OpenStreetmap, of the GPS position of the driver's vehicle with the GPS position and heading data as the driver's vehicle travels along the road. In other embodiments, the GPS street map subsystem may comprise a GPS map unit that includes the GPS/IMU subsystem. The street map subsystem 16, via the electronic control subsystem 24, merges the street map data obtained from the map provider with the GPS position and heading data of the driver's vehicle and the 3D position data of the detected objects, to construct a real-time two-dimensional (2D) top-view map representation of a traffic scene ahead of the driver's vehicle, as illustrated in FIG. 3. It then uses this representation and the subject vehicle speed to find active road segments ahead of the vehicle. Then it uses a method, such as ray tracing from the driver's eyes, or any other known method, to identify which part of the active road segments is obstructed by one of the detected objects. When such an active road segment is found to be obstructed, the system notifies the driver of the vehicle using at least one of an audio and video method.

The driver alert subsystem 18 can comprise any suitable means for providing a visual and/or audible warning message to the driver of the vehicle that an obstructing object has been detected ahead of the driver's vehicle. In some embodiments, the driver alert subsystem 18 can include a display 20 with a display screen 22 that can be viewed by the driver (e.g., a display screen located in or on the dashboard of the driver's vehicle or a display projected into the windshield of the driver's vehicle commonly referred to as a heads-up display) to display a visual alert comprising, for example, overlaying a 3D bounding box B1 of the obstructing object onto a live video feed of the road ahead of the driver's vehicle, as illustrated in FIG. 1. In other embodiments, the 2D top-view representation of the traffic scene illustrated in FIG. 3 can be displayed to the driver of the vehicle as a visual alert.

The electronic control subsystem 24 can comprise one or more processors, and/or one or more controllers, and one or more memory units which perform without limitation video image analysis, GPS control and ranging, radar control and analysis, lidar control and analysis, map communication, street map data, GPS position and heading data and 3D position data merging, active road detection, object/active road analysis, alert message generation, display control, and all other functions needed for the system to operate according to the present disclosure.

Figure 4:
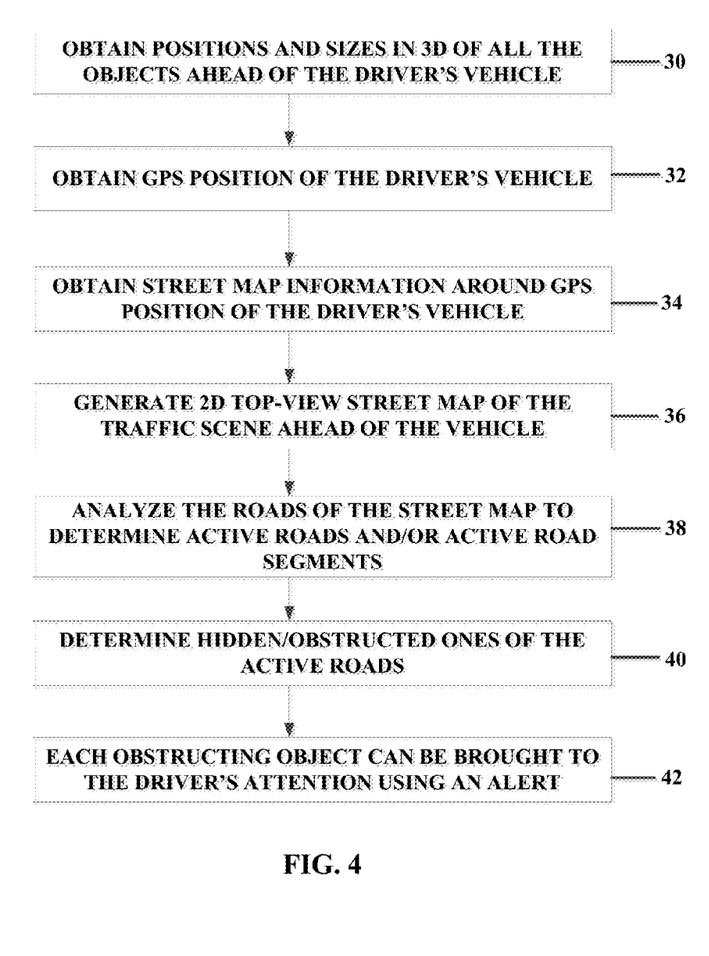
FIG. 4 is a flow chart of the hidden object detection method of the present disclosure, which illustrates the operations of the method that determine the portion of active roads which are obstructed from the driver's view in real-time.

FIG. 4 is a flow chart of the hidden object detection method of the present disclosure, which illustrates the operations of the method that determine the portion of active road segments which are obstructed from the driver's view in real-time. The method illustrated in FIG. 4 may be implemented with the system described above, with one or more subsystems of the system described above, or with variations of the system and/subsystems described above. Starting in block 30, the positions and sizes in 3D of all the objects ahead of the driver's vehicle are obtained.

In block 32, the absolute position (GPS position) of the driver's vehicle in terms of latitude and longitude are obtained. The GPS position data provides the absolute location or position on earth of the driver's vehicle as well as the heading of the vehicle.

In block 34, a map provider can be queried for street map information around the GPS position of the vehicle. Most map providers accept as input a bounding box of latitude and longitude coordinates and return the map in the form of digital data (e.g, vector data, generally in XML format) encoding the position of roads, buildings and other static elements present in the bounding box. A bounding box of a few hundred meters around the current vehicle position is usually sufficient.

In block 36, a 2D top-view representation of the traffic scene ahead of the vehicle is generated by combining the street map data, the 3D positions and sizes of the objects ahead of the driver's vehicle in the traffic scene, and the GPS position and heading data of the driver's vehicle. The 2D position of the objects ahead of the driver's vehicle in the traffic scene can obtained in some embodiments projecting their relative 3D coordinates onto the x-y plane (the plane of the 2D top-view street map), followed by the addition of the x-y absolute position of the driver's vehicle.

In block 38, the roads of the street map are analyzed to determine which parts of the roads are active roads segments. The active road segments can be obtained from the street map, in some embodiments, using the 2D position, speed and heading of the driver's vehicle.

Figure 5:
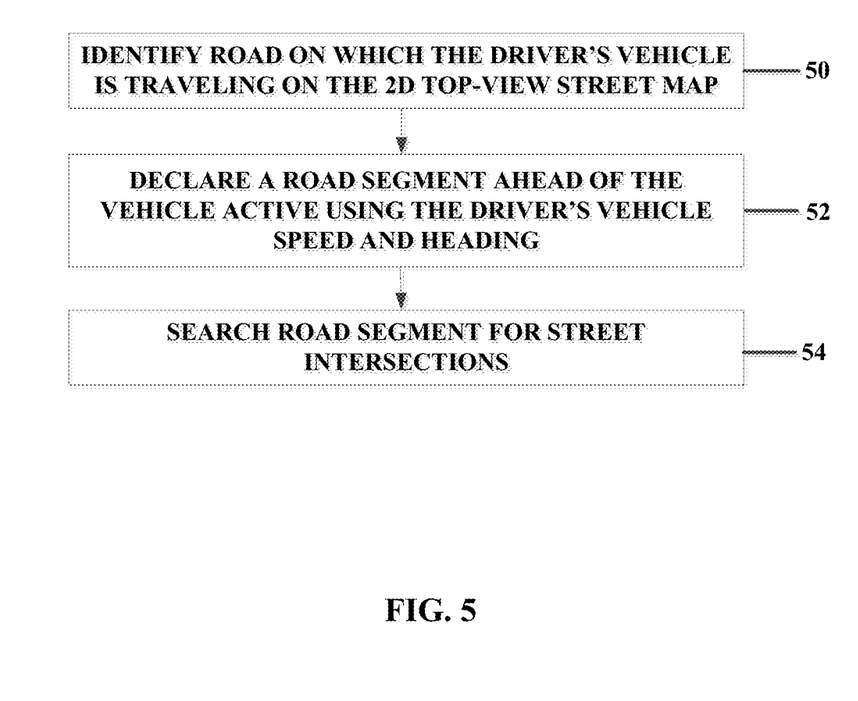
FIG. 5 is a flow chart illustrating a method for obtaining active roads and road segments.

FIG. 5 is a flow chart illustrating a method for obtaining active roads segments, as described in block 38 of the flow chart of FIG. 4. In block 50, the road on which the driver's vehicle is traveling is identified as illustrated in the 2D top-view representation of FIG. 3. In some embodiments, identifying this road may require the use of a conventional dynamic programming technique to account for imprecision of the GPS/IMU subsystem. Such techniques identify the most likely road being driven by calculating the most likely path through a set of candidate road segments.

In block 52, the driver's vehicle speed and heading are used to declare a road segment ahead of the vehicle on the road is active. The length of the road segment is a function of the vehicle's speed and other factors such as road conditions. The length of the road segment corresponds to a distance within which the vehicle can safely stop plus a margin.

In block 54, the road segment is searched for street intersections. When an intersection is found, the segment of the road leading to that intersection is added to a list of active road segments. The length of this road segment may be either fixed or depend on the vehicle's speed.

Referring again to FIG. 4, and to block 40, hidden or obstructed ones of the active road segments are determined. This determination can be made using the 2D top-view representation of the traffic scene illustrated in FIG. 3. From the position of the driver's eyes, rays are extended from the driver's eyes that pass by the corners of the objects detected in the traffic scene ahead of the vehicle. The segments formed by intersecting these rays with the active road segments determined above, are the hidden road segments obstructed by the objects. For each object, the amount of obstruction is calculated and if this amount rises above a defined threshold, the object is flagged as obstructing the driver's view and is reported to the driver. More specifically, the total distance of the hidden road generated by each object is collected and used to determine whether that object obstructs the driver's view of the active road segments.

FIG. 3 illustrates a traffic scene. The active road segments are identified by reference character AR1, AR1, and AR3. The portion of the active road segment AR3 that is obstructed is identified by reference character H and the object forming the obstruction is identified by reference character OB.

In block 42, each obstructing object can be brought to the driver's attention using an alert. In some embodiments, the alert can comprise an audio alert such as a chime or other sound. The audio alert in other embodiments can comprise an audio-locating sound at the virtual position of the obstructing vehicle, where the chime or other sound originates from the direction of the obstructing vehicle, thereby alerting the driver of the vehicle. In still other embodiments, the audio alert can comprise a computer-generated voice alerting the driver to the obstructing object (e.g., "warning, a car 10 meters ahead is obstructing the view to the street on the left"). In still other embodiments, the alert can comprise a visual alert. For example, in some embodiments, the visual alert can comprise overlaying a 3D bounding box B1 of the obstructing object onto a live video feed of the road ahead of the driver's vehicle displayed by the display 20, as illustrated in FIG. 1. In a further embodiment, the 3D bounding box or other representation of the obstructing object(s) may be projected as a semi-transparent hologram directly on the windshield such that it overlays seamlessly with the live view through the windshield. In various other embodiments, one or more audio alerts can be combined with each other and/or combined with one or more visual alerts. One or more visual alerts can be combined with one another also.

Although the object detection system and method have been described in terms of illustrative embodiments, they are not limited thereto. Rather, the appended claims should be construed broadly to include other variants and embodiments of same, which may be made by those skilled in the art without departing from the scope and range of equivalents of the system and method.

What is claimed is:

1. A system for a motorized land vehicle that detects objects obstructing a driver's view of an active road, the system comprising:

an inertial measurement unit-enabled global position system (GPS/IMU) subsystem for obtaining global position system (GPS) position and heading data of a land vehicle operated by the driver as the vehicle travels along a road;

a street map subsystem for obtaining street map data of the GPS position of the vehicle using the GPS position and heading data as the vehicle travels along the road;

a three-dimensional (3D) object detector subsystem for detecting objects ahead of the vehicle and determining a 3D position data of each of the detected objects ahead of the vehicle; and a driver alert subsystem;

wherein the street map subsystem merges the street map data, the GPS position and heading data of the vehicle and the 3D position data of the detected objects, to create real-time two-dimensional (2D) top-view representation of a traffic scene ahead of the vehicle, finds active roads ahead of the vehicle in the traffic scene, and finds each active road segment of the active roads ahead of the vehicle that is obstructed by one of the detected objects;

wherein the driver alert subsystem notifies the driver of the vehicle of each of the active road segments that is obstructed by one of the detected objects;

wherein the 3D object detector subsystem further determines a 3D size of each of the detected objects ahead of the vehicle; and wherein the 3D object detector subsystem includes at least one video camera and a neural network, the at least one video camera providing the 3D position data of each of the detected objects from motion data in a video stream of the traffic scene obtained therewith and the neural network providing the type and scale of the object from the video stream, wherein the 3D size of each of the objects is determined from the type and scale of the object combined with approximate standard sizes appropriate of the recognized type of object.

2. A system for a motorized land vehicle that detects objects obstructing a driver's view of an active road, the system comprising:

an inertial measurement unit-enabled global position system (GPS/IMU) subsystem for obtaining global position system (GPS) position and heading data of a land vehicle operated by the driver as the vehicle travels along a road;

a street map subsystem for obtaining street map data of the GPS position of the vehicle using the GPS position and heading data as the vehicle travels along the road;

a three-dimensional (3D) object detector subsystem for detecting objects ahead of the vehicle and determining a 3D position data of each of the detected objects ahead of the vehicle; and a driver alert subsystem;

wherein the street map subsystem merges the street map data, the GPS position and heading data of the vehicle and the 3D position data of the detected objects, to create real-time two-dimensional (2D) top-view representation of a traffic scene ahead of the vehicle, finds active roads ahead of the vehicle in the traffic scene, and finds each active road segment of the active roads ahead of the vehicle that is obstructed by one of the detected objects;

wherein the driver alert subsystem notifies the driver of the vehicle of each of the active road segments that is obstructed by one of the detected objects;

wherein the 3D object detector subsystem further determines a 3D size of each of the detected objects ahead of the vehicle; and wherein the 3D object detector subsystem includes radar, at least one video camera, and a neural network, the radar providing two-dimensional (2D) position and speed data of each of the detected objects, the at least one video camera providing a video stream of the traffic scene obtained therewith and the neural network providing the type and scale of the object from the video stream, wherein the 3D size of each of the objects is determined from the type and scale of the object combined with approximate standard sizes appropriate of the recognized type of object.

3. The system of claim 1, wherein the 3D object detector subsystem includes lidar providing 3D position and size of each of the detected objects.

4. The system of claim 3, wherein the 3D object detector subsystem further includes at least one video camera, and a neural network, providing a video stream of the traffic scene obtained therewith and the neural network providing the type of the object from the video stream, wherein the type of the object is used to verify and validate lidar information.

5. The system of claim 1, wherein the GPS/IMU subsystem and the street map subsystem comprise a GPS map unit.

6. The system of claim 1, wherein the GPS/IMU comprises a GPS chip and the street map data is provided by an Internet provider.

7. The system of claim 1, wherein the merging of the street map data, the GPS position and heading data of the vehicle and the 3D position data of the detected objects includes converting street map coordinates into relative distance from the vehicle's center of mass, making the 3D positions of the objects relative to the GPS/IMU subsystem, and projecting along a z axis a bounding box of the 3D object onto the street map.

8. The system of claim 1, wherein the finding of the active roads ahead of the vehicle in the traffic scene is determined with the 3D position, speed and the heading of the vehicle, wherein based on the vehicle's position, the closest road on the street map is selected, wherein based on the vehicle's speed, a proportional active distance ahead of the selected road is calculated and a corresponding segment of the road is deemed active and further searched for intersecting roads, wherein for each intersection found, the roads leading to the intersection become active.

9. The system of claim 1, wherein the finding of each active road segment of the active roads ahead of the vehicle that is obstructed by one of the detected objects comprises tracing rays from the drivers' eyes that pass by corners of each of the detected objects, and wherein segments formed by intersecting the rays with the active roads are hidden road segments obstructed by one of the detected objects.

10. The system of claim 1, wherein the driver alert subsystem generates an audio-locating sound at a virtual position of the obstructing vehicle thereby alerting the driver.

11. The system of claim 1, wherein the driver alert subsystem overlays a 3D bounding box of each of the obstructing objects onto a live video feed of the road ahead.

12. A system for a motorized land vehicle that detects objects obstructing a driver's view of an active road, the system comprising:

an inertial measurement unit-enabled global position system (GPS/IMU) subsystem for obtaining global position system (GPS) position and heading data of a land vehicle operated by the driver as the vehicle travels along a road;

a street map subsystem for obtaining street map data of the GPS position of the vehicle using the GPS position and heading data as the vehicle travels along the road;

a three-dimensional (3D) object detector subsystem for detecting objects ahead of the vehicle and determining a 3D position data of each of the detected objects ahead of the vehicle; and a driver alert subsystem;

wherein the street map subsystem merges the street map data, the GPS position and heading data of the vehicle and the 3D position data of the detected objects, to create real-time two-dimensional (2D) top-view representation of a traffic scene ahead of the vehicle, finds active roads ahead of the vehicle in the traffic scene, and finds each active road segment of the active roads ahead of the vehicle that is obstructed by one of the detected objects;

wherein the driver alert subsystem notifies the driver of the vehicle of each of the active road segments that is obstructed by one of the detected objects;

wherein the driver alert subsystem generates a computer generated voice alerting the driver to the obstructing vehicle.

13. The system of claim 1, wherein the driver alert subsystem generates a semi-transparent hologram directly on the windshield such that it overlays seamlessly with the live view through the windshield.

* * * * *